Feb. 19, 1924.
G. H. WATERS
TIRE CHAIN
Filed March 1, 1923
1,484,596
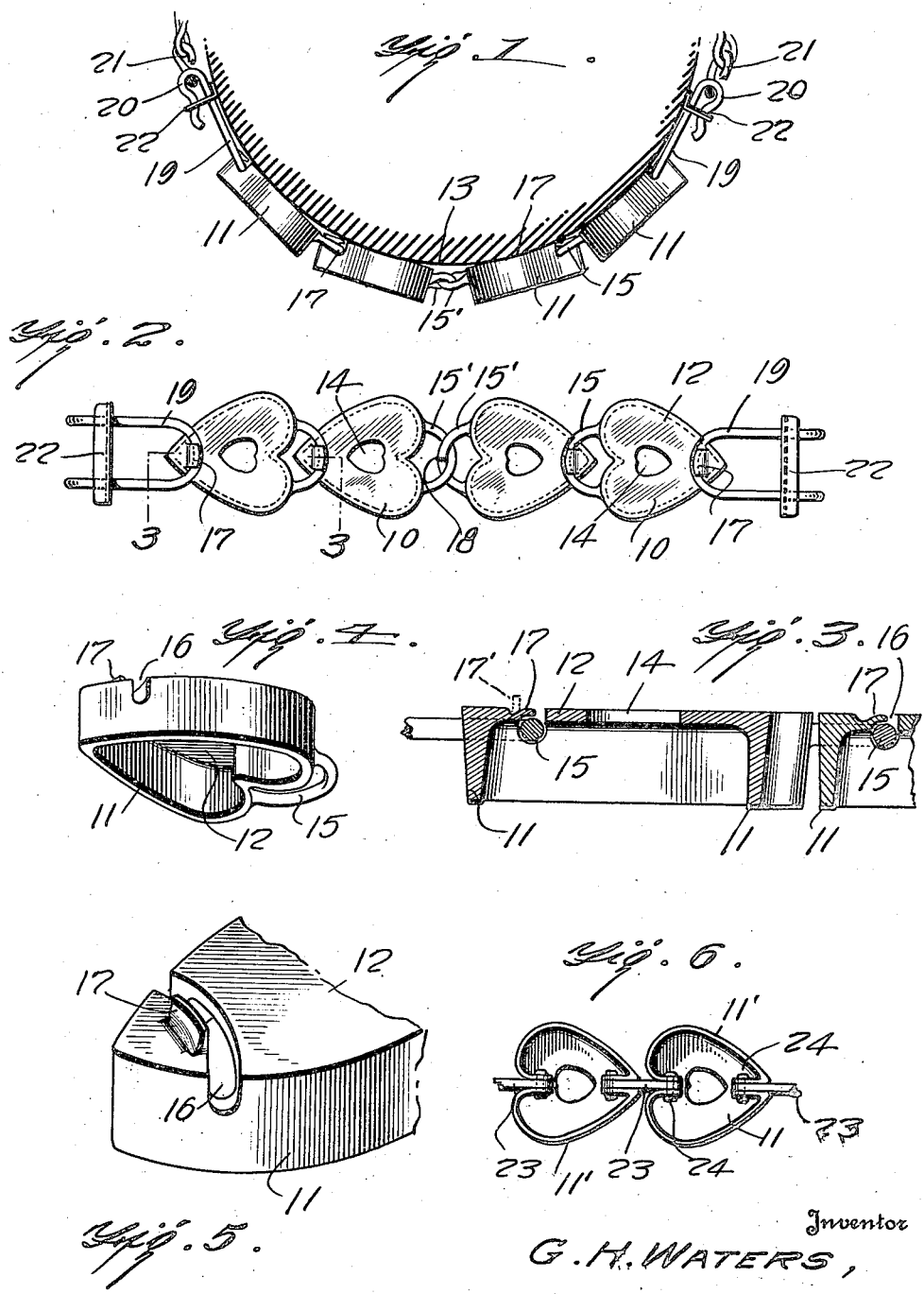
Inventor
G. H. WATERS,
By
Attorney Patented Feb. 19, 1924.

1,484,596

UNITED STATES PATENT OFFICE.

GEORGE H. WATERS, OF GLENFIELD, NEW YORK.

TIRE CHAIN.

Application filed March 1, 1923. Serial No. 622,126.

*To all whom it may concern:*

Be it known that I, GEORGE H. WATERS, a citizen of the United States, residing at Glenfield, in the county of Lewis and State of New York, have invented certain new and useful Improvements in Tire Chains; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to tire chains and has for an object to provide a cross chain for connecting the side chains of a tire chain organization which shall present new and improved features of convenience, wear, economy and traction facilities.

A further object of the invention is to provide a cross chain composed of a plurality of similar or preferably identical units with improved means for connecting the units into a series for transversely spanning a tread and improved means for connecting the cross chain to the side chains.

A further object of the invention is to provide a cross chain composed of a plurality of units of such shape and construction as to be formed by the drop forging of the same, whereby units of great wearing power and resistance can be cheaply and quickly produced, and interconnected to form a complete cross chain.

With these and other objects in view, the invention comprises certain novel parts, units, elements, constructions and combinations, as shown in the drawings, together with mechanical equivalents thereof, as will be hereafter more fully described and claimed.

In the drawings:

Figure 1 is a view in edge elevation of the improved tire chain, shown in operative position upon a conventional tire;

Figure 2 is a view in plan of that side of the cross chain which lies next the tire in use;

Figure 3 is a sectional view through one of the units and a part of an adjoining unit on a line corresponding to the length of the chain, as indicated by line 3—3 of Figure 2;

Figure 4 is a perspective view of one of the units;

Figure 5 is a perspective view of a fragment of one of the units, showing the side opposite the side disclosed in Figure 4;

Figure 6 is a plan view of a modified type.

Like characters of reference indicate corresponding parts throughout the views.

The improved cross chain which forms the subject matter of this application is made up of a plurality of units preferably identical, so that they may be produced from the same set of molds, dies or other devices, preferably, though not necessarily or with any limiting effect, by drop forging. These units, indicated at 10, for the purpose of resistance to skidding and increasing of traction, are preferably of the form ordinarily referred to as heart-shaped, the outline being in the form of a flange, 11, extending entirely around the margin of said heart-shaped figure and with a base surface, 12, for contacting with the tire shown conveniently at 13, in Figure 1. For lightness of construction, as well as convenience in the production, the base 12 will preferably be provided with an opening, 14, shown in the figure as also heart-shaped, although the invention is in no way limited to the shape of this opening.

Formed preferably integral with the unit 10 is a loop, 15, and each of said units is provided with a cross-cut, 16, into which the loop of the proximate unit will be received. To permit of the requisite or desired flexibility, the loops 15 and the cross-cuts 16 will be arcuate, which will permit each unit to move angularly relative to the other in all directions. To retain the loop 15 in the cross-cut 16, the unit is preferably forged with a lip, 17, which is closed down over the loop 15, after such loop is inserted in the cross-cut 16, thereby retaining the two units in association.

Preferably at the centre of the cross chain, the loops are interconnected by forming a cut at 18 which, after being inserted through the connecting loop 15, will be welded, as for instance by spot welding, and these loops, indicated as 15' will be given sufficient twist, as indicated at Figure 1, to permit the units thereby connected to lie in the same plane.

At the ends of the chain the cross-cuts 16 are provided with U-shaped connecting parts, 19, retained therein by the closing down of the lips 17, as referred to in regard to the connection with the loops 15. These U-shaped parts 19 are provided with hooks, 20, for hooking into the side chains 21 in the usual well-known manner, with sliding keepers, 22, for retaining the parts in such connection.

Instead of employing the loops 15 for connecting the units, at Figure 6 is shown a means whereby the flanges, 11', are separated to receive bars or links, 23, hingedly connected by means of pintles, 24. This construction provides substantially the same flexibility in the curvature corresponding to the curvature of the tire, but provides rigidity against movement in the matter of bending, which, under some conditions, is found desirable.

The manner of operation and use of cross chains in tire chains is so well known that, having shown the construction and assembly of the cross chain, its use and operation will be at once understood.

What I claim is:

1. A cross chain comprising a plurality of similar units, having each an outwardly extending flange and a tire-engaging base, loops formed upon the units and extending in parallelism with the bases, a cross-cut formed in the base extending into the flange of each unit proportioned to receive the loop of an adjacent unit, a lip formed upon the unit at the margin of the cross-cut adapted to be closed down over the loop contained therein, and means secured to the terminals of said organization for attaching the organization to side chains.

2. A cross chain for tire chains, comprising a plurality of similar units including a mean pair, each provided with an outwardly extending rigid loop, the mean pair of units being connected by the direct interconnection of their loops, other units connected to the remote extremities of the mean pair by means of their loops, and connecting bars pivotally connected with the extreme units of the organization.

In testimony whereof I hereunto affix my signature.

GEORGE H. WATERS.